United States Patent
Griffin et al.

(10) Patent No.: US 6,513,765 B2
(45) Date of Patent: Feb. 4, 2003

(54) ELECTRICAL CONDUIT SUPPORT

(76) Inventors: Frank M. Griffin, 725 Avenue H, NE., Winter Haven, FL (US) 33831; Frank L. Barrom, P.O. Box 253, Eagle Lake, FL (US) 33839-0253

(*) Notice: Subject to any disclaimer, the term of this patent is extended or adjusted under 35 U.S.C. 154(b) by 0 days.

(21) Appl. No.: 09/833,768

(22) Filed: Apr. 13, 2001

(65) Prior Publication Data

US 2001/0045496 A1 Nov. 29, 2001

Related U.S. Application Data

(60) Provisional application No. 60/197,402, filed on Apr. 14, 2000.

(51) Int. Cl.$^7$ .................................................. F16L 3/00
(52) U.S. Cl. ..................... 248/68.1; 248/74.3; 248/74.4
(58) Field of Search ............................... 248/68.1, 74.3, 248/74.4, 67.7; 52/699, 712; 249/190

(56) References Cited

U.S. PATENT DOCUMENTS

| | | | | |
|---|---|---|---|---|
| 2,622,123 A | | 12/1952 | Eakin ........................... 174/149 |
| 2,735,636 A | * | 2/1956 | Snyder .......................... 248/27 |
| 3,095,042 A | | 6/1963 | Clark et al. .................. 166/243 |
| 3,421,187 A | * | 1/1969 | Ryder ............................ 24/81 |
| 3,526,934 A | | 9/1970 | Owen, Sr. ....................... 24/81 |
| 3,557,861 A | * | 1/1971 | Duquesne ................... 157/1.24 |
| 3,822,460 A | * | 7/1974 | Rinehuls .................... 29/211 D |
| 4,602,760 A | | 7/1986 | Tiefenbach et al. .......... 248/544 |
| 4,618,114 A | | 10/1986 | McFarland .................... 248/65 |
| 4,775,121 A | | 10/1988 | Carty ......................... 248/68.1 |
| 5,035,383 A | * | 7/1991 | Rainville .................... 248/68.1 |
| H1012 H | | 1/1992 | Senatro ...................... 248/68.1 |
| 5,083,346 A | | 1/1992 | Orton ........................ 24/16 PB |
| 5,115,542 A | | 5/1992 | Gehres ......................... 24/543 |
| 5,234,185 A | * | 8/1993 | Hoffman et al. ............... 248/56 |
| 5,316,247 A | | 5/1994 | Wodka .......................... 248/73 |
| 5,319,837 A | * | 6/1994 | Kujawski .................... 24/16 R |
| 5,820,083 A | | 10/1998 | Geiger ....................... 248/74.3 |
| 5,820,166 A | * | 10/1998 | Webb .......................... 285/23 |
| 6,024,560 A | * | 2/2000 | Ito et al. ..................... 425/593 |
| 6,227,502 B1 | * | 5/2001 | Derman ..................... 248/74.4 |

\* cited by examiner

*Primary Examiner*—Anita King
*Assistant Examiner*—Steven Marsh
(74) *Attorney, Agent, or Firm*—Richard C. Litman

(57) ABSTRACT

The electrical conduit support device is a single planar piece designed to hold two electrical conduits such that their lengthwise dimensions are parallel and their separation corresponds to the standard separation of apertures for conduits on electrical junction boxes. In the first embodiment, the device has two apertures to accommodate conduits and a third aperture for a support rod. Each aperture has an annular sleeve extending from the main body of the conduit support which serves to keep the axis of each conduit perpendicular to the top surface of the conduit support, and which provides added support for the conduits and support rod. An optional tab can be added at one edge of the support device for attachment to another support. Other embodiments change the configuration of the basic circular apertures by forming slits, clips or splines to accommodate conduits and support rods of slightly different diameters to still achieve the parallel conduit relationship. The inexpensive device is produced in one piece by injection molding, and can be covered in concrete.

4 Claims, 3 Drawing Sheets

ELECTRICAL CONDUIT SUPPORT

CROSS-REFERENCE TO RELATED APPLICATION

This application claims the benefit of U.S. Provisional Patent Application Ser. No. 60/197,402, filed Apr. 14, 2000.

BACKGROUND OF THE INVENTION

1. Field of the Invention

The present invention relates to the structural support of utility channels in buildings. More specifically, the invention provides support for electrical conduits and is designed to be used during the concrete pouring phase of construction. It need not be retrieved once this phase is completed.

2. Description of Related Art

Numerous straps, harnesses, spacers, and supports have been devised to hold electrical conduits, communications channels, water pipes, air ducts, or other open portals. Most advancements have come by way of using new materials with fewer complicated or different parts. Because the space taken by these devices may account for some space that could be occupied by mechanical load bearing structures, it is desired that these devices be not obstructive, unduly large, or unwieldy. It would be advantageous to have them made of a single piece of material, because holding devices made of several pieces might tend to separate under pressure, stress, or strain.

The simpler the device is, the easier it will be to use. If such devices are used in quantity, the cost per item becomes increasingly important. It is also important on some applications to be able to use materials that can be buried in soil or left under the surface of poured concrete. Devices that will not expand or contract under temperature changes or corrode are preferred.

A conduit holder that is produced in one simple piece and will not corrode, expand, contract, or fall apart is desired. An inexpensive conduit holder that can remain under the surface of poured concrete is also desired. One or more of these attributes will be seen to be lacking with the patents referenced below.

U.S. Statutory Invention Registration No. H1012, issued on Jan. 7, 1992, to Clement A. Senatro, describes a clamp made in two pieces and three apertures in a vertical line such that each piece has half of each aperture. A single bolt holds both pieces together and both pieces to a substrate.

U.S. Pat. No. 2,622,123, issued on Dec. 16, 1952, to William M. Eakin, describes three apertures made from multiple pieces arranged in a triangular arrangement and the multiple pieces mutually exert a force on each other so as to hold the whole together. The bottommost piece is bolted into an external platform.

U.S. Pat. No. 3,095,042, issued on Jun. 25, 1963, to Edgar W. Clark, Jr., et al., describes three pieces of cylindrical tubing welded together on their external surfaces such that their axes are parallel. In spite of its apparent simplicity this device involves threaded inner surfaces, and was designed with a specific application in mind, i.e., joining tubing together and suspending the tubing inside an oil well casing. The device is not molded or cast from a single piece.

U.S. Pat. No. 3,526,934, issued on Aug. 20, 1970, to David H. Owen, Sr. describes a two-piece interlocking set of strips shaped with matching semicircular indentations meant to hold two electrical conduits. The two pieces connect via a tongue and groove method. There is no indication this device was meant to be submerged in concrete. A problem with two-piece interlocking conduit holders is that if one part gets warped or bent, the two strips can slip apart.

U.S. Pat. No. 4,602,760, issued on Jul. 29, 1986, to Karolyn L. Tiefenbach, et al., describes a bundle type clamp holding axially aligned cylindrical objects together in a particular relation to a static structure. This type of clamp was designed to be used with appliances or cars and not with structures. This device was not meant to be covered in concrete.

U.S. Pat. No. 4,618,114, issued on Oct. 21, 1986, to James H. McFarland, describes a conduit system supporting and clamping a series of conduits of different diameters in a parallel and spaced apart relationship maintained by vertically and horizontally interlocking modular units. Each unit consists of a frame member having at least one side including an arcuate surface corresponding to the outside diameter of a conduit. The conduit is supported on the arcuate surface of one frame member and clamped down by an interlocking member from above. The bottommost support is anchored to a floor or bottom of a recess. This device is applicable in the context of large systems and is not particularly useful for a small set of conduits about to be encased in concrete. This support system requires multiple parts.

U.S. Pat. No. 4,775,121, issued on Oct. 4, 1988, to James F. Carty, describes a plastic clamp used for attaching cables or wires to a wall. A support member and a retaining arm of rigid material are co-extruded with and connected by a flexible hinge member at one end of the support member and arm. A series of partitions extend inwardly from the support member toward the retaining arm; and each of these forms a support for a cable. A semi-rigid article like this was not meant to be encased in concrete.

U.S. Pat. No. 5,083,346, issued on Jan. 28, 1992, to Douglas O. Orton, describes a fastening assembly for elongate articles comprising a ring-shaped member and a non-deformable flexible strap. The strap goes around the outside of the two elongate articles with the ring in between the two. The strap goes through the ring in one direction after encountering the outside of one elongate article and through the ring in the other direction after going around the other elongate article. The free end of the strap is inserted through a ratchet slit on the other end of the strap. This device requires two pieces to produce.

U.S. Pat. No. 5,115,542, issued on May 26, 1992, to Michelle R. Gehres, describes a reusable hose separating clip made from an elongated piece of plastic unit including a hinge centrally located along the length of the clip. The clip is bent into two sides which are nearly mirror images of one another, but a latch on one side has to have something to latch into on the other. Along the edge where both sides come together, there are arcuate lengths alternating with flat lengths, but the top and bottom edges are mirror images with respect to these arcuate and flat portions. The arcuate lengths hold hoses, cables, conduits or support rods at the user's discretion. This device may best be used with objects that have a variable cross-section such as a hose that can swell. The device might not be as efficient at holding conduits or rods because the opposite flat parts are not held rigidly together.

U.S. Pat. No. 5,316,247, issued on May 31, 1994, to Michael A. Wodka, describes a pole clip for arranging wires or other elongate objects around the circumference of a pole. The clip has a resilient and flexible hollow C-shaped body, such that the inner arcuate surface snaps to fit around a pole. The inner "C" and the nearly concentric outer "C" are radially connected at the ends and in the middle. This produces two symmetric hollow regions between the inner and outer C-shaped body. Small slits symmetrical with the C-shaped bodies allow elongate articles to be held about the pole. The elongate objects should be smaller in diameter than the pole in order to avoid distorting the shape of the clip.

U.S. Pat. No. 5,820,083, issued on Oct. 13, 1998, to Gerard G. Geiger, describes a tie mounting system for securing elongate items to a supporting structure. The mount is secured to the stud with a nut and washer, and provides an anchoring loop through which the tie can be looped to secure the tie and the items to the mount. This device is made from a number of parts. Because it is meant to be adjustable in view of its nuts and bolts, it is not meant to be covered with concrete.

None of the above inventions and patents, taken either singly or in combination, is seen to describe the instant invention as claimed.

SUMMARY OF THE INVENTION

The electrical conduit support is a single piece designed to hold two electrical conduits such that their lengthwise dimensions are parallel and their separation corresponds to the standard separation of apertures for conduits on electrical junction boxes. In its primary form, the electrical conduit support has two apertures to accommodate conduits and a third aperture for a support rod. The conduit support is produced in one piece from a thermoplastic material by injection molding, and is so inexpensive that it can be covered in concrete. Its physical properties are such that it will not be subject to significant thermal expansion or contraction. It will not corrode or set up corrosive reactions with nearby objects or other components of the support environment.

Accordingly, it is a principal object of the invention to provide an electrical conduit support which may be manufactured in one piece and can become a part of the internal support of a concrete structure.

It is another object of the invention to provide an electrical conduit support which is easy to install on a support rod or on two sections of conduit.

It is a further object of the invention to provide an electrical conduit support which can accommodate standard sizes of conduit with standard distances of separation.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is directed toward a support for electrical conduits EC, particularly when the conduits are to be set in poured concrete PC. The preferred first embodiment of the present invention is depicted in FIGS. 1–4, as 10.

Figure 1:
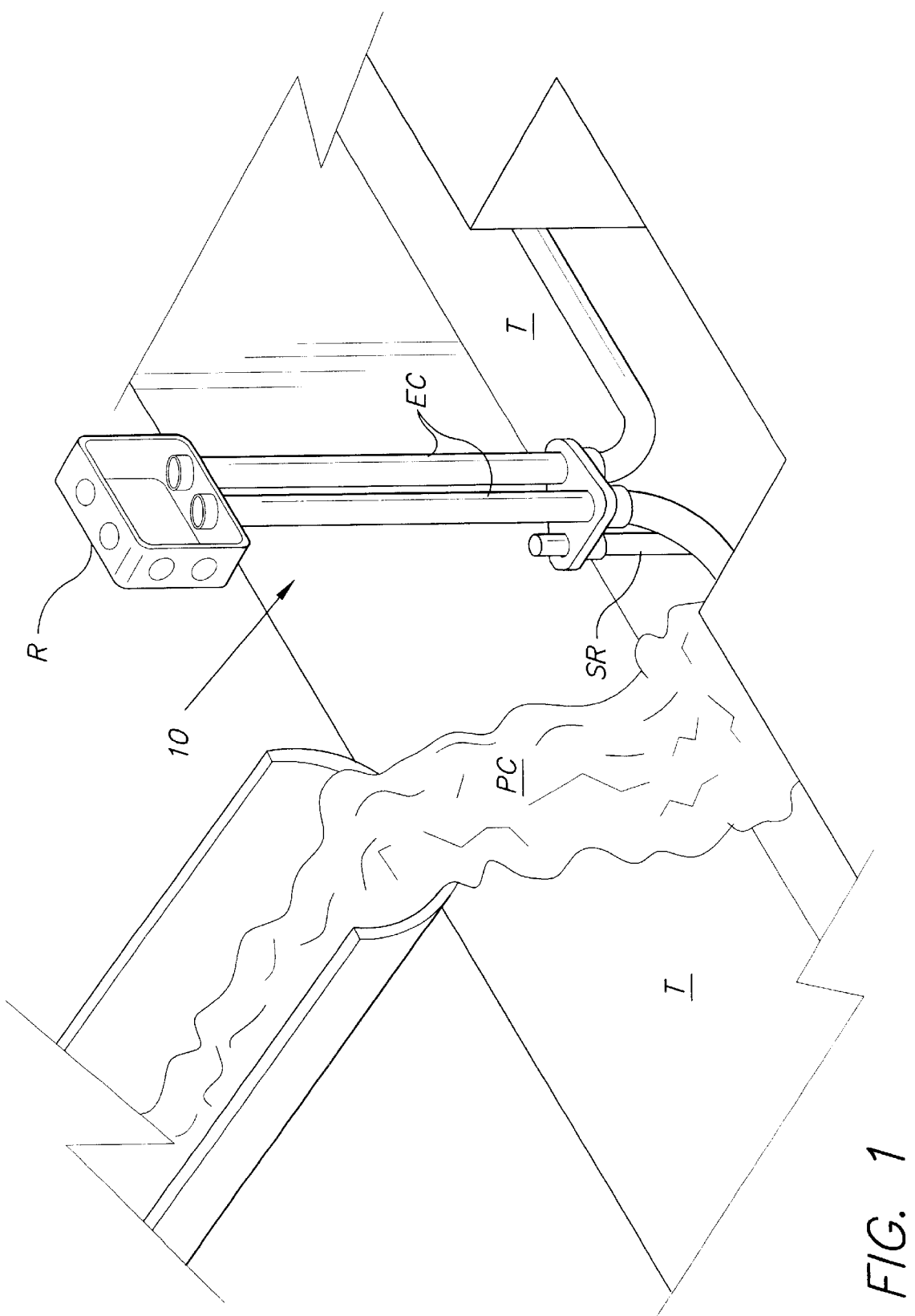
FIG. 1 is an environmental, perspective view of the electrical conduit support being buried in concrete according to the present invention.

As illustrated in an environmental view in FIG. 1, a pair of horizontal and vertical conduits EC of equal diameter are held in place by the electrical conduit support device 10 with the help of a support rod SR installed through the third aperture and based in the bottom of the trench T. The conduits EC are installed parallel and separated at a proper distance so that a receptacle box R is easily installed before or during a later operation. This device 10 holds conduits EC parallel at ground level and below a horizontal line that represents the top surface of the concrete and the trench T. Once the conduits EC are positioned and staked securely so that they are perpendicular to the horizontal line, the poured concrete PC will submerge the conduit support 10 and the support rod R in the trench T.

Figure 2:
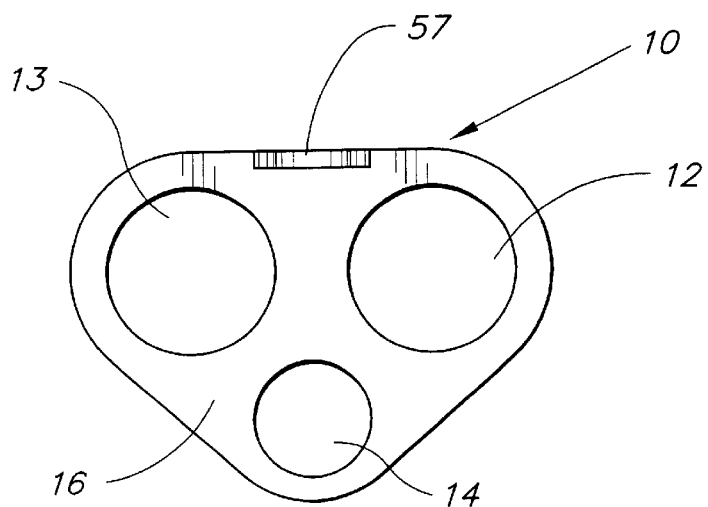
FIG. 2 is a top plan view of a first embodiment of the electrical conduit support lacking slots according to the present invention.
Figure 3:
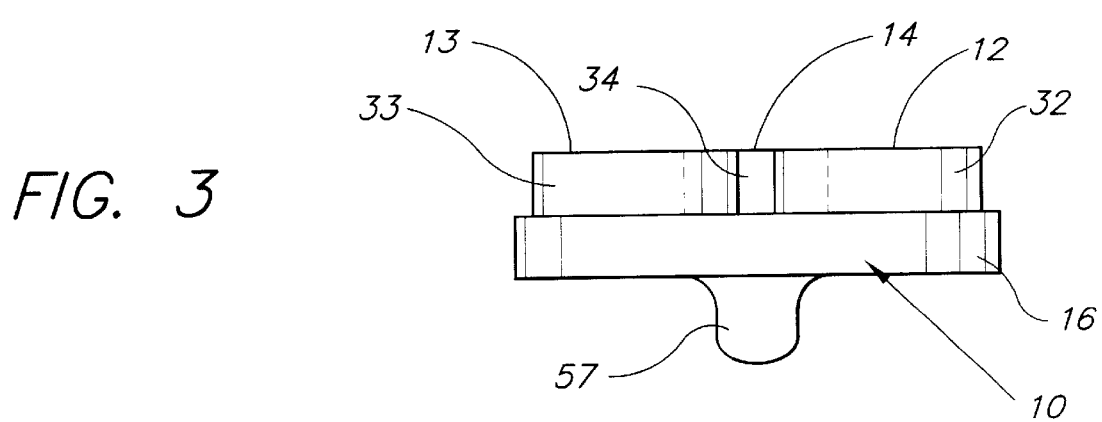
FIG. 3 is a side elevational view of the first embodiment of the electrical conduit support in an inverted position according to the present invention.
Figure 4:
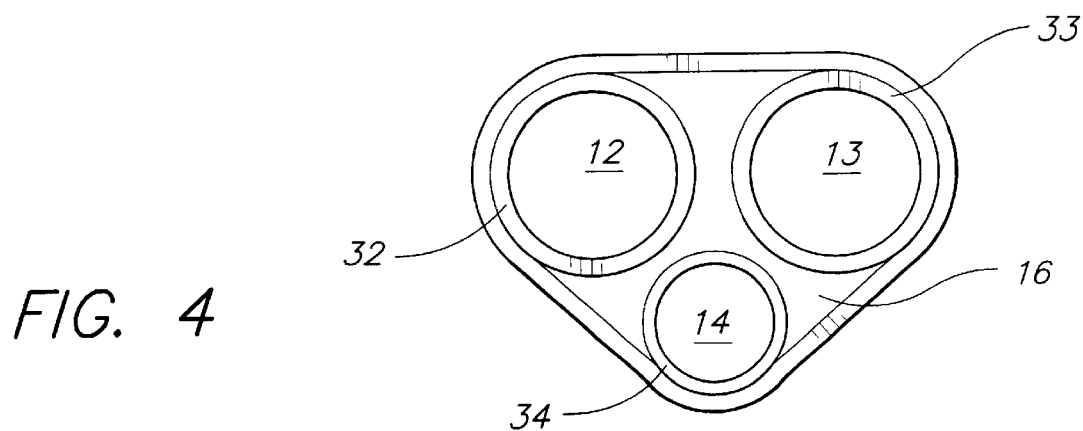
FIG. 4 is a bottom plan view of the electrical conduit support of the first embodiment supporting three conduits according to the present invention.

According to the preferred embodiment as illustrated in FIGS. 2–4, the electrical conduit support 10 is made in a single piece from a thermoplastic material by injection molding in a triangular shape with arcuate rounding at the corners. As shown in FIG. 2, three circular apertures 12, 13 and 14 are inset from the rounded corners. The three apertures 12, 13 and 14 are defined in the main body 16 of the electrical conduit support, which is a flat, planar plate. The apertures 12 and 13 are sized and dimensioned to accommodate electrical conduits while aperture 14 is designed to hold a support rod SR. A planar tab 57 extends perpendicularly at one edge of support device 10 for the convenience of attaching the device 10 to any other desired construction structural member by utilizing a self-tapping screw (not shown).

As illustrated in FIGS. 3 (inverted) and 4 (bottom view), each aperture has an annular sleeve extending up from the main body 16 of the conduit support 10. The first conduit aperture 12 corresponds with annular sleeve 32, whereas the second conduit aperture 13 corresponds with annular sleeve 33. Aperture 14, intended for the support rod SR, is associated with annular sleeve 34. The sleeves 32, 33 and 34 serve to keep the axis of each conduit EC perpendicular to the top surface of the electrical conduit support 10, and provide added support for the conduits EC and support rod SR. The sleeves 32, 33 and 34 are also designed to prevent slipping. No annular sleeve extends to the margins of the electrical conduit support 10 or to its interior. The main body 16 of the electrical conduit support provides a web which maintains the electrical conduits EC and support rod SR in parallel, spaced relation.

Figure 5:
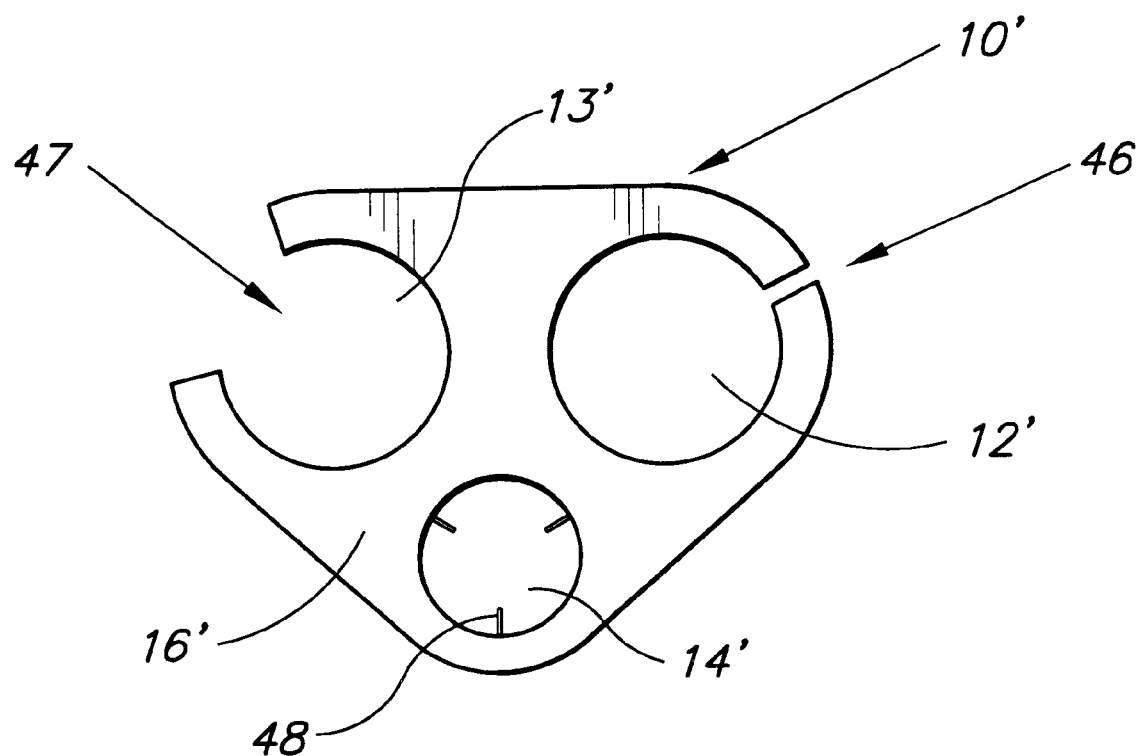
FIG. 5 is a top plan view of a second embodiment of the electrical conduit support illustrating several alternatives of the configuration of a conduit aperture combined as being illustrative in one electrical conduit support.

FIG. 5 illustrates three other modifications of the device 10' which can be combined as shown or, alternately, one feature can be utilized for all the apertures in the main planar body 16'. The first aperture 12' can have a slit 46. The second aperture 13' can have a clip configuration 47. The smaller third aperture 14' can have a plurality of splines 48 extending inward. These aperture configurations are utilized to compensate for any variance in the outside diameter of the conduit being held to maintain parallel support and space relationships. For example, aperture 12' with the slit 46 can be pinched for a conduit having a slightly smaller diameter. Aperture 13' with the larger clip opening 47 can be enlarged slightly for a slightly larger diameter conduit. Aperture 14' with splines 48 can be utilized to support a smaller diameter support rod. A tab 57 can be added to the device 10' as in device 10 shown in FIG. 2.

Thus, a versatile assortment of electrical conduit support devices has been shown which are inexpensive, durable and versatile in holding electrical conduits of various sizes in a parallel relationship when embedded in concrete and the like.

It is to be understood that the present invention is not limited to the sole embodiment described above, but encompasses any and all embodiments within the scope of the following claims.

We claim:

1. An electrical conduit support device comprising a substantially planar body of one-piece unitary construction having a triangular configuration, said body including a first, a second and a third circular aperture defined therein, each said aperture being positioned adjacent a respective corner of the triangular body, said body further including a first, a second and a third annular sleeve, each said sleeve concentrically protruding from each said aperture for supporting and preventing slippage of an electrical conduit, said body having a tab disposed along an edge thereof midway between the first and the second aperture, said tab extending perpendicular from the edge in a direction opposite from each said sleeve, wherein each said first and said second aperture is sized and dimensioned to accommodate an electrical conduit, and said third aperture is sized to accommodate a support rod, whereby said device supports electrical conduits in parallel, spaced relation during concrete pouring.

2. The electrical conduit support device according to claim 1, wherein each said corner of the triangular body is a rounded corner.

3. The electrical conduit support device according to claim 2, wherein at least one said rounded corner includes a slit for adjustably accommodating various diameters of the electrical conduit.

4. The electrical conduit support device according to claim 1, wherein said body is fabricated from a thermoplastic material by injection molding.

* * * * *